(12) United States Patent
Bandwar et al.

(10) Patent No.: US 12,154,278 B2
(45) Date of Patent: Nov. 26, 2024

(54) SCALE IMAGE RESOLUTION FOR MOTION ESTIMATION

(71) Applicant: QUALCOMM Incorporated, San Diego, CA (US)

(72) Inventors: Nitin Bandwar, San Diego, CA (US); Pia Zobel, Hinanit (IL); Roee Hardoon, Zichron Yaakov (IL); Sungwon Lee, Huntington Beach, CA (US); Tauseef Kazi, San Diego, CA (US); Bing Han, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 17/853,422

(22) Filed: Jun. 29, 2022

(65) Prior Publication Data
US 2024/0005518 A1    Jan. 4, 2024

(51) Int. Cl.
G06T 7/207    (2017.01)
G06T 7/215    (2017.01)

(52) U.S. Cl.
CPC .............. *G06T 7/207* (2017.01); *G06T 7/215* (2017.01)

(58) Field of Classification Search
None
See application file for complete search history.

(56) References Cited

U.S. PATENT DOCUMENTS

| | | | |
|---|---|---|---|
| 9,305,362 B1 | 4/2016 | Szedo et al. | |
| 2009/0237516 A1 | 9/2009 | Jayachandra et al. | |
| 2012/0162449 A1 | 6/2012 | Braun et al. | |
| 2017/0094311 A1* | 3/2017 | Chou | H04N 19/53 |
| 2020/0154131 A1* | 5/2020 | Iyer | H04N 5/33 |

OTHER PUBLICATIONS

International Search Report and Written Opinion—PCT/US2023/066214—ISA/EPO—Jul. 24, 2023.

* cited by examiner

*Primary Examiner* — Mikhail Itskovich
(74) *Attorney, Agent, or Firm* — Polsinelli/Qualcomm

(57) ABSTRACT

Systems and techniques are provided for conserving resources when performing motion estimation. An example process can include determining, based on an input image and a reference image, motion vectors identifying motion between the input image and the reference image; determining whether the motion indicated by the motion vectors is below a first threshold; based on a determination that the motion indicated by the motion vectors is below the first threshold, refraining from determining a local motion between the input image and the reference image; determining a transform matrix based on the motion vectors and without using a local motion between the input image and the reference image; and adjusting the input image based on the transform matrix.

30 Claims, 8 Drawing Sheets

SCALE IMAGE RESOLUTION FOR MOTION ESTIMATION

TECHNICAL FIELD

The present disclosure generally relates to image processing. For example, aspects of the present disclosure relate to techniques and systems for dynamically scaling image resolutions for motion estimation to conserve resources.

BACKGROUND

Electronic devices are increasingly equipped with camera hardware that can be used to capture image frames (e.g., still images and/or video frames) for consumption. For example, an electronic device (e.g., a mobile device, an Internet Protocol (IP) camera, an extended reality device, a connected device, a laptop computer, a smartphone, a smart wearable device, a game console, etc.) can include one or more cameras integrated with the electronic device. The electronic device can use the camera to capture an image or video of a scene, a person, an object, or anything else of interest to a user of the electronic device. The electronic device can capture (e.g., via the camera) an image or video and process, output, and/or store the image or video for consumption (e.g., displayed on the electronic device, saved on a storage, sent or streamed to another device, etc.).

In some cases, the electronic device can further process the image or video for certain effects such as depth-of-field or portrait effects, extended reality (e.g., augmented reality, virtual reality, and the like) effects, image stylization effects, image enhancement effects, etc., and/or for certain applications such as computer vision, extended reality, object detection, recognition (e.g., face recognition, object recognition, scene recognition, etc.), compression, feature extraction, authentication, segmentation, and automation, among others. However, the further processing of the image or video can increase the amount of resources utilized and/or consumed by the electronic device such as, for example and without limitation, power and compute resources, among others. Accordingly, there is a need in the art to reduce the amount of resources utilized and/or consumed by electronic devices when generating, processing, and/or manipulating image frames (e.g., still images or video frames).

BRIEF SUMMARY

Systems and techniques are described herein for conserving resources when performing motion estimation. According to at least one example, a method is provided for conserving resources when performing motion estimation. The method can include: determining, by a computing device based on an input image and a reference image, motion vectors indicating motion between the input image and the reference image; determining, by the computing device, whether the motion indicated by the motion vectors is below a first threshold; based on a determination that the motion indicated by the motion vectors is below the first threshold, refraining from determining a local motion between the input image and the reference image; determining, by the computing device, a transform matrix based on the motion vectors and without using the local motion between the input image and the reference image; and adjusting, by the computing device, the input image based on the transform matrix.

In another example, an apparatus for processing image data is provided that includes at least one memory and at least one processor (e.g., configured in circuitry) coupled to the at least one memory. The at least one processor is configured to: determine, based on an input image and a reference image, motion vectors indicating motion between the input image and the reference image; determine whether the motion indicated by the motion vectors is below a first threshold; based on a determination that the motion indicated by the motion vectors is below the first threshold, refrain from determining a local motion between the input image and the reference image; determine a transform matrix based on the motion vectors and without using the local motion between the input image and the reference image; and adjust the input image based on the transform matrix.

In another example, a non-transitory computer-readable medium is provided that has stored thereon instructions that, when executed by one or more processors, cause the one or more processors to: determine, based on an input image and a reference image, motion vectors indicating motion between the input image and the reference image; determine whether the motion indicated by the motion vectors is below a first threshold; based on a determination that the motion indicated by the motion vectors is below the first threshold, refrain from determining a local motion between the input image and the reference image; determine a transform matrix based on the motion vectors and without using the local motion between the input image and the reference image; and adjust the input image based on the transform matrix.

In another example, an apparatus for processing image data is provided. The apparatus includes: means for determining, based on an input image and a reference image, motion vectors indicating motion between the input image and the reference image; means for determining whether the motion indicated by the motion vectors is below a first threshold; means for refraining, based on a determination that the motion indicated by the motion vectors is below the first threshold, from determining a local motion between the input image and the reference image; means for determining a transform matrix based on the motion vectors and without using the local motion between the input image and the reference image; and means for adjusting the input image based on the transform matrix.

In some aspects, each of the apparatuses described above is, can be part of, or can include a mobile device, a smart or connected device, a camera system, a computer system, an advanced driver assist computer, a robotic system, and/or an extended reality (XR) device (e.g., a virtual reality (VR) device, an augmented reality (AR) device, or a mixed reality (MR) device). In some examples, the apparatuses can include or be part of a vehicle, a mobile device (e.g., a mobile telephone or so-called "smart phone" or other mobile device), a wearable device, a personal computer, a laptop computer, a tablet computer, a server computer, a robotics device or system, an aviation system, or other device. In some aspects, the apparatus includes an image sensor (e.g., a camera) or multiple image sensors (e.g., multiple cameras) for capturing one or more images. In some aspects, the apparatus includes one or more displays for displaying one or more images, notifications, and/or other displayable data. In some aspects, the apparatus includes one or more speakers, one or more light-emitting devices, and/or one or more microphones. In some aspects, the apparatuses described above can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
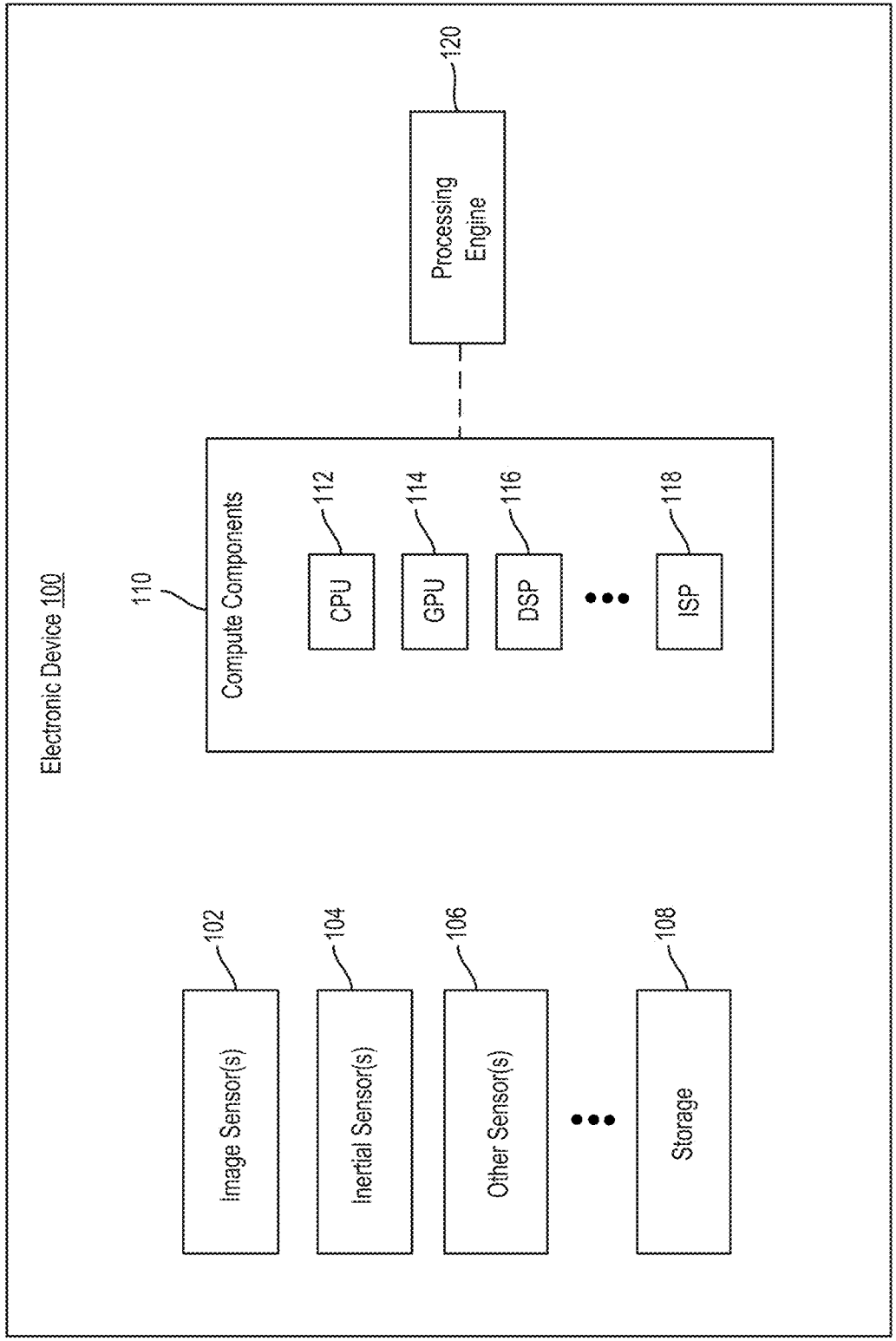
FIG. 1 is a simplified block diagram illustrating an example electronic device, in accordance with some examples of the present disclosure.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of examples and aspects of the application. However, it will be apparent that various aspects and examples may be practiced without these specific details. The figures and description are not intended to be restrictive.

The ensuing description provides examples only, and is not intended to limit the scope, applicability, or configuration of the disclosure. Rather, the ensuing description of the examples and aspects of the disclosure will provide those skilled in the art with an enabling description for implementing an example of the disclosure. It should be understood that various changes may be made in the function and arrangement of elements without departing from the scope of the application as set forth in the appended claims.

As previously explained, electronic devices are increasingly equipped with camera hardware to capture images and/or videos for consumption. For example, an electronic device (e.g., a mobile device, an IP camera, an extended reality device, a laptop computer, a tablet computer, a smart television, a head-mounted display, smart glasses, a game console, a camera system, a connected device, a smartphone, etc.) can include a camera to allow the electronic device to capture a video or image of a scene, a person, an object, etc. The image or video can be captured and processed by the electronic device and stored or output for consumption (e.g., displayed on the electronic device and/or another device).

In some cases, the camera hardware and the images and/or video frames captured by the camera hardware can be used for a variety of applications such as, for example and without limitation, computer vision, extended reality (e.g., augmented reality, virtual reality, and the like), object detection, image recognition (e.g., face recognition, object recognition, scene recognition, etc.), feature extraction, localization, authentication, photography, automation, compression, motion estimation, image stabilization, temporal noise reduction, among others. Moreover, the further processing of the image or video for certain effects can increase the amount of resources utilized and/or consumed by the electronic device. For example, the further processing of the frames (e.g., still images or video frames) can increase the electronic device's power consumption and resource utilization (e.g., compute resources, storage resources, power resources, etc.), among others.

In some examples, certain features and functionalities implemented by an electronic device such as, for example and without limitation, image stabilization and temporal noise reduction, rely on global and local motion information. Global motion can be estimated based on input(s) from a gyroscope of the electronic device. The inputs from the gyroscope along with texture processing can accurately represent a motion of the electronic device motion. The motion of the electronic device and the texture processing within the frame is referred to herein as global motion. In some cases, motion vectors can be estimated using one or more motion estimation techniques such as, for example and without limitation, Harris corner detection and related techniques, referred to hereinafter as descriptor matching estimation (DME). In some examples, a DME algorithm can determine global motion matrix that indicates or reflects global motion associated with the electronic device.

In some cases, the electronic device can generate local motion estimates by comparing consecutive frames to determine the relative motion of the consecutive frames. The electronic device can estimate a local motion map using one or more local motion estimation techniques such as, for example and without limitation, descriptor matching estimation (DME), semi global matching (SGM), and the like, referred to herein as DMM or local motion estimation. A local motion map can provide an estimate of the motion between two different frames (e.g., how much the scene depicted in the frames and/or the features in the scene depicted in the frames has/have moved between the frames). In some examples, the local motion or local motion map (e.g., the estimated motion between frames) can indicate how much a frame should be warped to account for motion between the frame and a previous frame from a sequence of frames.

In some cases, a local motion estimation implementation (e.g., a DMM implementation) can use an SGM algorithm to generate a motion map. In some cases, an SGM operation can be time bound and can be computationally expensive as the entire image associated with the SGM operation is scanned to generate the motion map. In some examples, to achieve a balance between image quality and power consumption, the SGM operation can be performed on a downscaled version of a target image. In some cases, an engine for video analytics (EVA) can generate the motion map and integrate the global motion estimates to create a transform matrix. An image processing engine (IPE) of the electronic device can use the transform matrix to perform a final image stabilization on the target image.

In some cases, even processing a smaller resolution image to generate a motion map can result in a significant amount of power consumption by the electronic device. Moreover, in implementations where there is little or minimal local or global motion or when the local motion is confined to a smaller zone, the electronic device can still consume a significant amount of power to estimate motion. In some cases, the image quality enhancement may not justify such a high-power consumption.

Systems, apparatuses, processes (also referred to as methods), and computer-readable media (collectively referred to as "systems and techniques") are described herein for conserving resources when performing motion estimation. For example, the systems and techniques described herein can reduce an amount of resources utilized and/or consumed by electronic devices when generating, processing, and/or manipulating image frames (e.g., still images or video frames). In some examples, the systems and techniques described herein can provide algorithmic techniques for reducing a power consumption by an electronic device when estimating motion in cases where there is little to no motion (e.g., global and/or local motion) and/or where the motion is locally confined to a smaller zone (e.g., a zone that is smaller than a threshold size). In some examples, the systems and techniques described herein provide algorithms configured to significantly reduce an electronic device's power consumption is such scenarios (e.g., where there is little to no motion and/or where the motion is locally confined to a smaller zone). In some examples, the systems and techniques described herein can provide a mechanism to return to full resolution local motion estimation (e.g., DMM) when motion is detected locally.

In some cases, the systems and techniques described herein can implement one or more components and/or algorithms. For example, in some cases, the systems and techniques described herein can implement a combination of a motion map, motion vectors and a temporal filter indication (TFI) generated by an image processing engine (IPE) to dynamically switch between global motion estimation (e.g., DME), smaller resolution local motion estimation (e.g., smaller resolution DMM) and full resolution local motion estimation (e.g., full resolution DMM). The systems and techniques described herein can be implemented in a variety of contexts, applications, scenarios and/or use cases. For example, the systems and techniques described herein can be implemented in video recording and/or image processing scenarios having one or more conditions.

To illustrate, in some cases, the systems and techniques described herein can be implemented in video recording and/or image processing scenarios such as, for example, a mobile device set on a tripod recording a scene with no motion (or motion below a threshold) such as a natural scenery, a mobile device on a tripod recording a performance where a subject's movement is below a threshold (e.g., small or minimal), a mobile device recording a frame where the mobile device has a relatively low amount (e.g., below a threshold) of motion in its field-of-view (FOV) and/or the mobile device is recording at a higher frames-per-second (FPS) rate (e.g., a recording rate that is above a threshold such that frames are captured at a faster rate and relative motion between frames is smaller than when the same scene is recorded at a lower FPS, in cases involving multi-frame high dynamic range (MFHDR) merge, in cases where motion-compensated temporal filtering (MCTF) processing is impacted, in cases involving thermal mitigation to reduce a power consumption of the electronic device and to prevent a thermal runaway condition in high-power encoding implementations, etc. In some cases, the applicable scenarios and/or use cases can be extended further depending on how far a primary subject or target on the screen is from a recording point and how much motion is perceived.

Examples of the systems and techniques described herein for processing data are illustrated in FIG. 1 through FIG. 7 and described below.

FIG. 1 is a diagram illustrating an example electronic device 100, in accordance with some examples of the disclosure. The electronic device 100 can implement the systems and techniques disclosed herein. For example, in some cases, the electronic device 100 can dynamically scale an image resolution for motion estimation in order to conserve power, as further described herein.

The electronic device 100 can also perform various tasks and operations such as, for example and without limitation, extended reality (e.g., augmented reality, virtual reality, mixed reality, virtual reality with pass-through video, and/or the like) tasks and operations (e.g., tracking, mapping, localization, content rendering, pose estimation, object detection/recognition, etc.), image/video processing and/or post-processing, data processing and/or post-processing, computer graphics, machine vision, object modeling and registration, multimedia rendering and/or composition, object detection, object recognition, localization, scene recognition, and/or any other data processing tasks, effects, and/or computations.

In the example shown in FIG. 1, the electronic device 100 includes one or more image sensors 102, one or more inertial sensors 104 (e.g., one or more inertial measurement units, etc.), one or more other sensors 106 (e.g., one or more radio detection and ranging (radar) sensors, light detection and ranging (LIDAR) sensors, acoustic/sound sensors, infrared (IR) sensors, magnetometers, touch sensors, laser rangefinders, light sensors, proximity sensors, motion sensors, active pixel sensors, machine vision sensors, ultrasonic sensors, etc.), storage 108, compute components 110, and a processing engine 120. In some cases, the processing engine 120 can include one or more engines such as, for example and without limitation, one or more motion estimation engines, one or more image processing engines, one or more image frontends (e.g., one or more image pre-processing engines), one or more video analytics engines, one or more machine learning engines, one or more image post-processing engines, one or more rendering engines, etc. In some examples, the electronic device 100 can include additional software and/or software engines such as, for example, an extended reality (XR) application, a camera application, a video gaming application, a video conferencing application, etc.

The components 102 through 120 shown in FIG. 1 are non-limiting examples provided for illustration and explanation purposes. In other examples, the electronic device 100 can include more, less, and/or different components than those shown in FIG. 1. For example, in some cases, the electronic device 100 can include one or more display devices, one more other processing engines, one or more receivers (e.g., global positioning systems, global navigation satellite systems, etc.), one or more communications devices (e.g., radio frequency (RF) interfaces and/or any other wireless/wired communications receivers/transmitters), one or more other hardware components, and/or one or more other software and/or hardware components that are not shown in FIG. 1. An example architecture and example hardware components that can be implemented by the electronic device 100 are further described below with respect to FIG. 7.

The one or more image sensors 102 can include any number of image sensors. For example, the one or more image sensors 102 can include a single image sensor, two image sensors in a dual-camera implementation, or more than two image sensors in other, multi-camera implementations. The electronic device 100 can be part of, or implemented by, a single computing device or multiple computing devices. In some examples, the electronic device 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, a laptop or notebook computer, a tablet computer, a set-top box, a smart television, a display device, a gaming console, a video streaming device, an IoT (Internet-of-Things) device, a smart wearable device (e.g., a head-mounted display (HMD), smart glasses, etc.), or any other suitable electronic device(s).

In some implementations, the one or more image sensors 102, one or more inertial sensor(s) 104, the other sensor(s) 106, storage 108, compute components 110, and processing engine 120 can be part of the same computing device. For example, in some cases, the one or more image sensors 102, one or more inertial sensor(s) 104, one or more other sensor(s) 106, storage 108, compute components 110, and processing engine 120 can be integrated into a smartphone, laptop, tablet computer, smart wearable device, gaming system, and/or any other computing device. In other implementations, the one or more image sensors 102, one or more inertial sensor(s) 104, the other sensor(s) 106, storage 108, compute components 110, and processing engine 120 can be part of two or more separate computing devices. For example, in some cases, some of the components 102 through 120 can be part of, or implemented by, one computing device and the remaining components can be part of, or implemented by, one or more other computing devices.

The one or more image sensors 102 can include one or more image sensor. In some examples, the one or more image sensors 102 can include any image and/or video sensors or capturing devices, such as a digital camera sensor, a video camera sensor, a smartphone camera sensor, an image/video capture device on an electronic apparatus such as a television or computer, a camera, etc. In some cases, the one or more image sensors 102 can be part of a multi-camera system or a computing device such as an extended reality (XR) device (e.g., an MD, smart glasses, etc.), a digital camera system, a smartphone, a smart television, a game system, etc. The one or more image sensors 102 can capture image and/or video content (e.g., raw image and/or video data), which can be processed by the compute components 110.

In some examples, the one or more image sensors 102 can capture image data and generate frames based on the image data and/or provide the image data or frames to the compute components 110 for processing. A frame can include a video frame of a video sequence or a still image. A frame can include a pixel array representing a scene. For example, a frame can be a red-green-blue (RGB) frame having red, green, and blue color components per pixel; a luma, chroma-red, chroma-blue (YCbCr) frame having a luma component and two chroma (color) components (chroma-red and chroma-blue) per pixel; or any other suitable type of color or monochrome picture.

The electronic device 100 can include one or more inertial sensors 104. The one or more inertial sensors 104 can include, for example and without limitation, a gyroscope, an accelerometer, an inertial measurement unit (IMU), and/or any other inertial sensors. The one or more inertial sensors 104 can detect motion (e.g., translational and/or rotational) of the electronic device 100. For example, the one or more inertial sensors 104 can detect a specific force and/or angular rate of the electronic device 100. In some cases, the one or more inertial sensors 104 can detect an orientation of the electronic device 100. The one or more inertial sensors 104 can generate linear acceleration measurements, rotational rate measurements, and/or heading measurements. In some examples, the one or more inertial sensors 104 can be used to measure the pitch, roll, and yaw of the electronic device 100.

The electronic device 100 can optionally include one or more other sensor(s) 106. In some examples, the one or more other sensor(s) 106 can detect and generate other measurements used by the electronic device 100. In some cases, the compute components 110 can use data and/or measurements from the one or more image sensors 102, the one or more inertial sensors 104, and/or the one or more other sensor(s) 106 to track a pose of the electronic device 100. As previously noted, in other examples, the electronic device 100 can also include other sensors, such as a magnetometer, an acoustic/sound sensor, an IR sensor, a machine vision sensor, a smart scene sensor, a radio detection and ranging (RADAR) sensor, a light detection and ranging (LIDAR) sensor, a depth sensor, a light sensor, etc.

The storage 108 can be any storage device(s) for storing data. Moreover, the storage 108 can store data from any of the components of the electronic device 100. For example, the storage 108 can store data from the one or more image sensors 102 (e.g., image or video data), data from the one or more inertial sensors 104 (e.g., measurements), data from the one or more other sensors 106 (e.g., measurements), data from the compute components 110 (e.g., processing parameters, timestamps, preferences, virtual content, rendering content, scene maps, tracking and localization data, object detection data, configurations, motion vectors, XR application data, recognition data, synchronization data, outputs, etc.), and/or data from the processing engine 120. In some examples, the storage 108 can include a buffer for storing frames and/or other camera data for processing by the compute components 110.

The one or more compute components 110 can include a central processing unit (CPU) 112, a graphics processing unit (GPU) 114, a digital signal processor (DSP) 116, and/or an image signal processor (ISP) 118. The compute components 110 can perform various operations such as camera synchronization, image enhancement, computer vision, graphics rendering, extended reality (e.g., tracking, localization, pose estimation, mapping, content anchoring, content rendering, etc.), image/video processing, sensor processing, recognition (e.g., text recognition, facial recognition, object recognition, feature recognition, tracking or pattern recognition, scene recognition, occlusion detection, etc.), machine learning, filtering, object detection, and any of the various operations described herein. In the example shown in FIG. 1, the compute components 110 can implement the processing engine 120. For example, the operations for the processing engine 120 can be implemented by any of the compute components 110. The processing engine 120 can include one or more neural network models, such as the unsupervised learning models described herein. In some examples, the compute components 110 can also implement one or more other processing engines.

While the electronic device 100 is shown to include certain components, one of ordinary skill will appreciate that the electronic device 100 can include more or fewer components than those shown in FIG. 1. For example, the electronic device 100 can also include, in some instances, one or more memory devices (e.g., RAM, ROM, cache, and/or the like), one or more network interfaces (e.g., wired and/or wireless communications interfaces and the like), one or more display devices, and/or other hardware or processing devices that are not shown in FIG. 1. An illustrative example of a computing device and hardware components that can be implemented with the electronic device 100 is described below with respect to FIG. 7.

In some examples, the electronic device 100 can implement one or more algorithms for estimating a global motion associated with the electronic device 100 and/or local motion associated with frames captured by the one or more image sensors 102 of the electronic device 100. Moreover, the electronic device 100 can implement the systems and techniques described herein to reduce a power consumption of the electronic device 100 when estimating global and/or local motion. In some cases, the electronic device 100 can shutdown or disable a motion estimation processing pipeline implemented by a video analytics engine when an amount of motion detected, estimated, and/or predicted by the video analytics engine is below a threshold. In such examples, the electronic device 100 can rely on global motion vectors, such as global motion vectors estimated using a Harris corner detection algorithm and/or a similar algorithm, to calculate an image transform matrix.

In other examples, such as in intermediate motion cases, when the estimated motion is above a first threshold (referred to as a lower threshold) and below a second threshold (referred to as an upper threshold) that is greater than the first threshold, the electronic device 100 can switch to using an input image with a downscaled resolution based on a computational processing of a temporal filtering indication (TFI). For example, the electronic device 100 can downscale the input image to a lower resolution (e.g., downscaled by 4, 8, 16, or any other factor) before running semi-global matching operations on the downscaled input image, thus conserving power of the device. The algorithm implemented by the electronic device 100 can revert to full resolution motion estimation when the motion map processing perceives the need. For example, the algorithm can revert to full resolution motion estimation when the estimated motion is above a threshold (e.g., above the second or upper threshold). In some cases, the algorithm can be fluid and can switch to processing a downscaled image, such as an image downscaled by 16, rather than reverting to global motion estimation (e.g., motion vector estimation using Harris corner detection) depending on an evaluation of an image quality (IQ).

Figure 2:
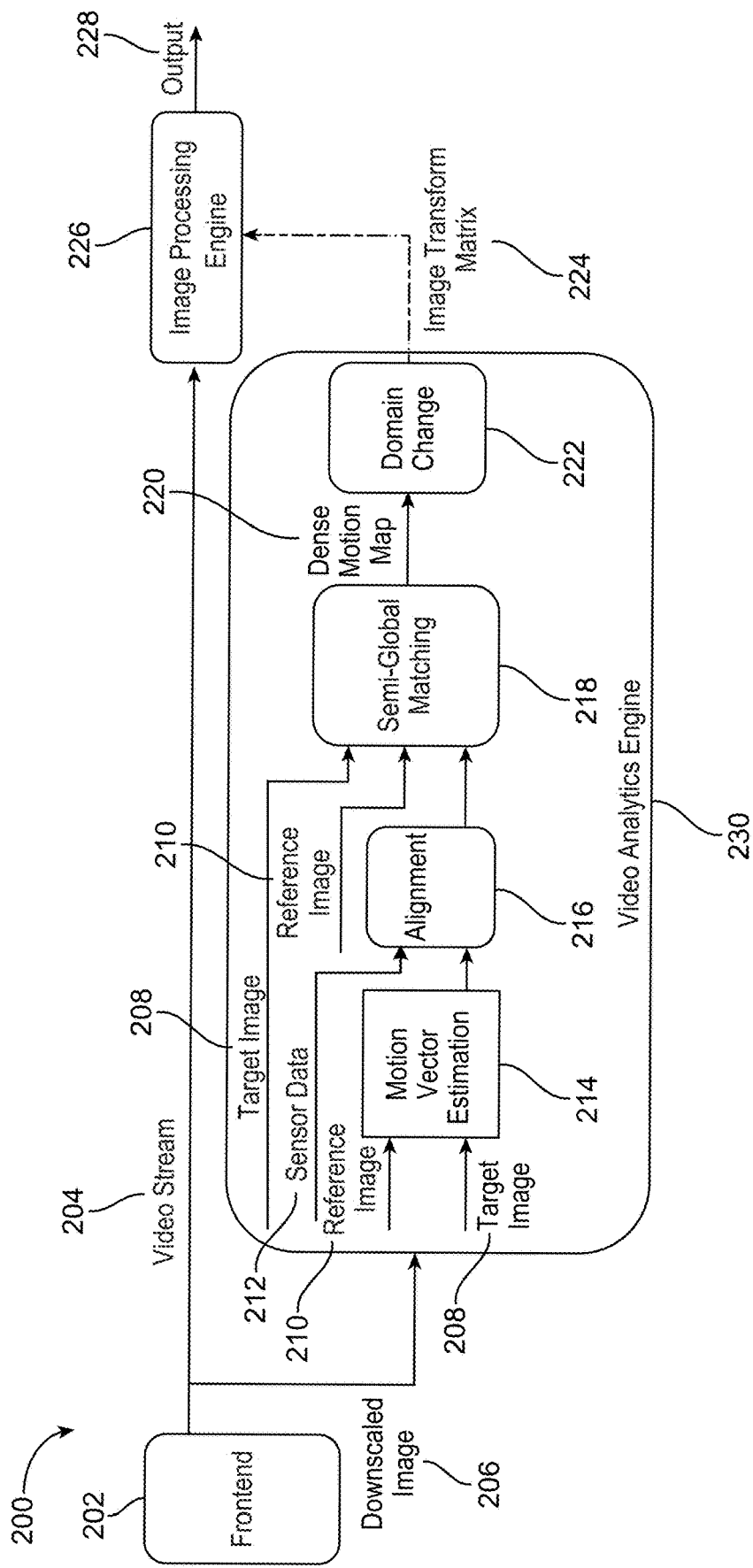
FIG. 2 is a diagram illustrating an example flow for a motion estimation implementation, in accordance with some examples of the present disclosure.

FIG. 2 is a diagram illustrating an example flow 200 for a motion estimation implementation. The example flow 200 shows a pipeline for motion estimation that includes global motion estimation, local motion estimation between image frames, and semi-global matching (SGM).

In this example, the frontend engine 202 downscales an input image from a video stream 204 to generate a downscaled image 206. The frontend engine 202 provides the downscaled image 206 to a video analytics engine 230 for processing. The video analytics engine 230 performs a motion vector estimation 214 using a target image 208 and a reference image 210. In some examples, the target image 208 can be the same as the downscaled image 206 or can be generated based on the downscaled image 206. In some cases, the motion vector estimation 214 can estimate motion vectors using a Harris corner detection algorithm and/or the like. In some examples, the motion vector estimation 214 can estimate a global motion associated with the target image 208, the reference image 210, and/or the electronic device 100. In some cases, prior to processing the target image 208 and the reference image 210, the electronic device 100 can process the target image 208 and the reference image 210 to remove noise from the images.

The motion vector estimation 214 can generate motion vectors for the target image 208. In some examples, the motion vectors can indicate a global motion associated with the target image 208 and/or the electronic device 100. The motion vectors generated by the motion vector estimation 214 can then be processed by an alignment block 216 to account for global motion. In some examples, the alignment block 216 can use sensor data 212 to align the motion vectors generated by the motion vector estimation 214 to account for a global motion associated with the electronic device 100. The sensor data 212 can include one or more measurements obtained by the one or more inertial sensors 104 of the electronic device 100. For example, in some cases, the sensor data 212 can include gyroscope measurements obtained by a gyroscope(s) from the one or more inertial sensors 104. The gyroscope measurements can include an orientation and/or angular velocity of the electronic device 100 measured by the gyroscope(s). The alignment block 216 can use the orientation and/or angular velocity of the electronic device 100 to align the motion vectors generated by the motion vector estimation 214 to account for the global motion of the electronic device 100 (e.g., to account for the orientation and/or angular velocity of the electronic device 100).

In some examples, the alignment block 216 can warp the motion vectors from the motion vector estimation 214 based on the sensor data 212 (e.g., based on the gyroscope measurements, such as the orientation and angular velocity measurements). The alignment block 216 can input the warped motion vectors into an SGM block 218 configured to perform semi-global matching. The SGM block 218 can process the warped motion vectors, the target image 208, and the reference image 210 to generate a dense motion map 220. In some cases, the SGM block 218 can determine a local motion associated with the motion vectors from the motion vector estimation 214. In some examples, the SGM block 218 can compare the target image 208 with the reference image 210 to determine a motion between the target image 208 and the reference image 210. For example, the SGM block 218 can compare the target image 208 with the reference image 210 to determine how a local motion between the target image 208 and the reference image 210.

In some cases, the dense motion map 220 can reflect the local motion between the target image 208 and the reference image 210. In some cases, the dense motion map 220 can reflect the local motion between the target image 208 and the reference image 210 as well as a global motion estimated for the target image 208 and/or the reference image 210. In some examples, the dense motion map 220 can include motion estimates for blocks or regions (e.g., for each block or region) of image data in the target image 208. The blocks or regions of image data can include blocks or regions of pixels of the target image 208. For example, the blocks or regions of image data can include N×N (e.g., 4×4, 8×8, etc.)

blocks of pixels. In this example, the dense motion map can include motion estimates for each N×N block of pixels in the target image 208.

The domain change block 222 can use a global stabilization matrix and the dense motion map 220 to generate a transform matrix 224. For example, the domain change block 222 can warp the dense motion map 220 using a global stabilization matrix to obtain the transform matrix 224. The domain change block 222 can provide the transform matrix 224 to an image processing engine 226, which can use the transform matrix 224 to generate an output 228. For example, the image processing engine 226 can use the transform matrix 224 to perform image stabilization operations on one or more image frames, such as one or more image frames of the video stream 204. To illustrate, the image processing engine 226 can use the transform matrix 224 to stabilize one or more image frames from the video stream 204.

Figure 3A:
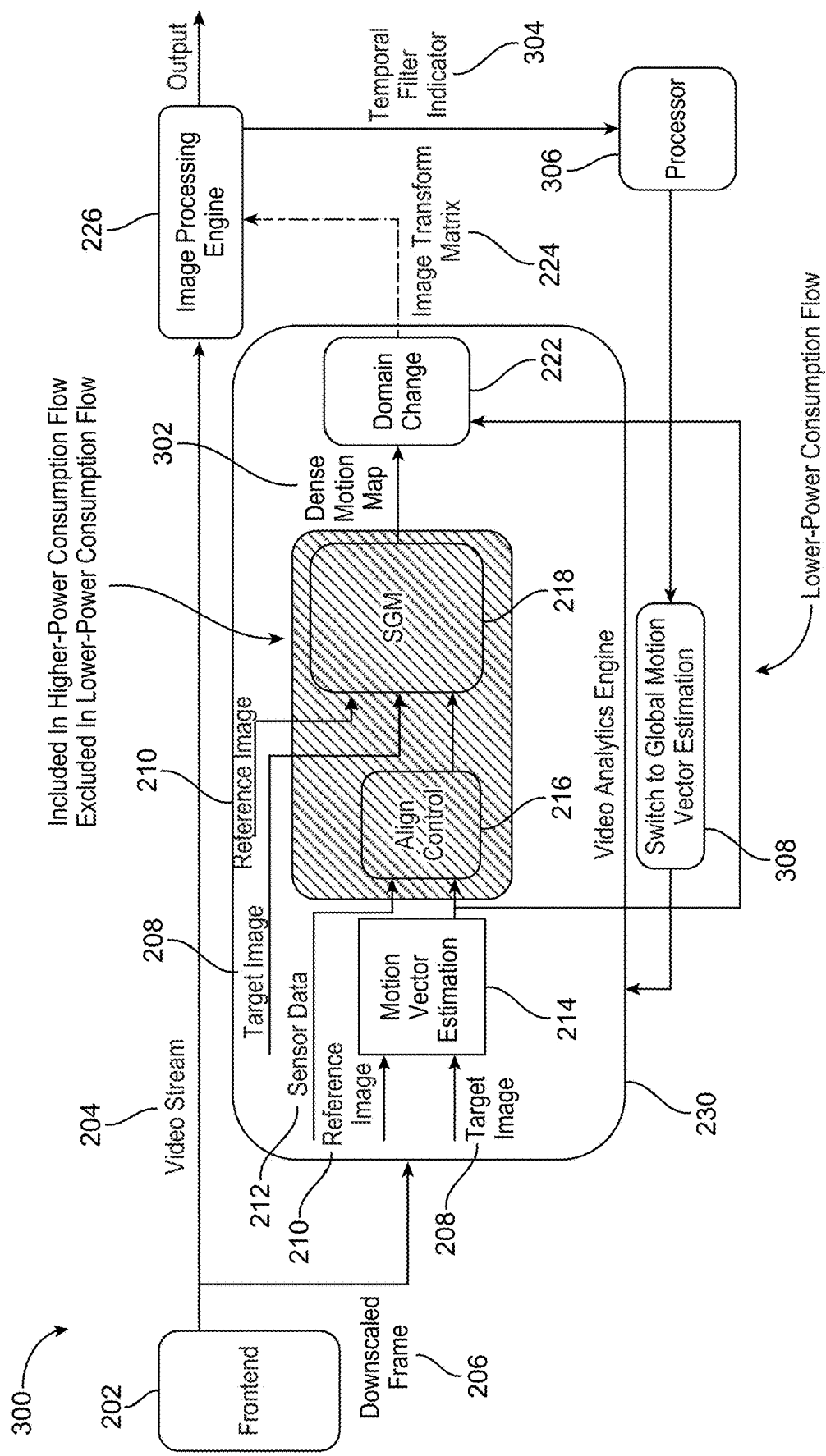
FIGS. 3A and 3B are diagrams illustrating example flows for motion estimation implementations with feedback mechanisms, in accordance with some examples of the present disclosure.

FIG. 3A is a diagram illustrating an example flow 300 for a motion estimation implementation with a feedback mechanism. In this example, the flow 300 includes a higher-power consumption pipeline that includes blocks 214, 216, 218, and 222, and a lower-power consumption pipeline that includes blocks 214 and 222. The electronic device 100 can switch between the higher-power consumption pipeline and the lower-power consumption pipeline based on local motion estimates, as further described herein.

Moreover, the flow 300 provides a pipeline for motion estimation with feedback incorporated between a processor 306 and the video analytics engine 230. The feedback allows the video analytics engine 230 to switch between using motion vectors for certain operations, such as image stabilization, to using a dense motion map for those operations. The switching between using motion vectors and a dense motion map can allow the electronic device 100 to reduce its power consumption without reducing (or with a minimal reduction) in the accuracy and/or quality of the outputs generated by the electronic device 100.

In some examples, the switch between the use of motion vectors and a dense motion map can include switching between using a lower resolution image (e.g., a downscaled image) for the specific operations to using a higher resolution image (e.g., a full resolution image). In some cases, the switch between the use of motion vectors and a dense motion map can be based on an amount of motion of the electronic device 100 and/or an amount of motion between images in a sequence of image frames. For example, when the electronic device 100 determines that an amount of global and/or local motion is below a threshold (e.g., meaning less motion), the electronic device 100 can switch to the motion estimation operations associated with a lower power consumption, and when the amount of global and/or local motion is above a threshold (e.g., meaning more motion), the electronic device 100 can switch to the motion estimation operations associated with a higher power consumption.

In the example flow 300, the frontend engine 202 downscales an input image from the video stream 204 to generate the downscaled image 206, as previously explained with respect to FIG. 2. The frontend engine 202 provides the downscaled image 206 to the video analytics engine 230, which performs the motion vector estimation 214 to generate motion vectors as previously described with respect to FIG. 2. The motion vector estimation 214 can generate motion vectors for the target image 208. In some examples, the motion vectors can indicate a global motion associated with the target image 208 and/or the electronic device 100. The motion vectors generated by the motion vector estimation 214 can then be processed by an alignment block 216 to account for global motion. In some examples, the alignment block 216 can use the sensor data 212 to align the motion vectors generated by the motion vector estimation 214 to account for a global motion associated with the electronic device 100.

In some examples, the alignment block 216 can warp the motion vectors from the motion vector estimation 214 based on the sensor data 212 (e.g., based on the gyroscope measurements, such as the orientation and angular velocity measurements). The alignment block 216 can input the warped motion vectors into an SGM block 218 configured to perform semi-global matching. The SGM block 218 can process the warped motion vectors and the target image 208 to generate the dense motion map 302.

The domain change block 222 can use a global stabilization matrix and the dense motion map 302 to generate a transform matrix 224. For example, the domain change block 222 can warp the dense motion map 302 using a global stabilization matrix to obtain the transform matrix 224. The domain change block 222 can provide the transform matrix 224 to the image processing engine 226, which can use the transform matrix 224 to generate an output 310. For example, the image processing engine 226 can use the transform matrix 224 to perform image stabilization operations on one or more image frames, such as one or more image frames of the video stream 204. To illustrate, the image processing engine 226 can use the transform matrix 224 to stabilize one or more image frames from the video stream 204.

In some examples, the image processing engine 226 can generate a temporal filter indicator 304. In some cases, the temporal filter indicator 304 can indicate an amount of motion associated with the input image (e.g., target image 208), the electronic device 100, and/or the transform matrix 224. The image processing engine 226 can send the temporal filter indicator 304 to the processor 306, which can process the temporal filter indicator 304 to obtain a local motion estimate associated with the input image (e.g., target image 208) and/or the transform matrix 224. The processor 306 can include any processing device of the electronic device 100. For example, the processor 306 can include or represent the CPU 112. In other examples, the processor 306 can include or represent any other processor such as, for example, the GPU 114, the DSP 116, the ISP 118, and/or any other processor.

The processor 306 can use the temporal filter indicator 304 to provide feedback to the video analytics engine 230 and/or to determine what type of feedback to provide to the video analytics engine 230. In some cases, the processor 306 can use the motion information (e.g., a local motion estimate and/or a global motion estimate) identified in the temporal filter indicator 304 to provide feedback to the video analytics engine 230. For example, depending on the amount of motion indicated in the temporal filter indicator 304, the feedback can instruct the video analytics engine 230 to revert to global motion estimation (with or without local motion estimation), to switch to using a lower resolution image to estimate motion, or switch to using local motion estimation (with or without global motion estimation).

In some cases, if the temporal filter indicator 304 indicates no motion or an amount of motion below a threshold, the processor 306 can instruct the video analytics engine 230 to revert from a higher-power consumption pipeline to a lower-power consumption pipeline. In some examples, the higher-power consumption pipeline can include a mode in which the video analytics engine 230 implements global and local motion estimation and/or processes a full resolution frame as opposed to a downscaled frame. In some examples, the lower-power consumption pipeline can include a mode in which the video analytics engine 230 implements global motion estimation but does not implement local motion estimation and/or processes a downscaled frame as opposed to a full resolution frame.

For example, in the flow 300, the processor 306 determines an amount of local motion identified in the temporal filter indicator 304. If the temporal filter indicator 304 indicates no local motion or local motion below a threshold, the processor 306 can generate an instruction 308 for the video analytics engine 230 that instructs the video analytics engine 230 to revert from global and local motion vector estimation to global motion vector estimation (e.g., a lower-power consumption pipeline for motion estimation). In some cases, the processor 306 can implement hysteresis logic to trigger the fallback (e.g., to trigger the instruction 308 instructing the video analytics engine 230 to revert to global motion vector estimation without local motion vector estimation) only after a certain number of frames show no local motion or local motion below a threshold.

In some examples, if the temporal filter indicator 304 indicates no local motion or local motion below a threshold, the processor 306 can reprogram or reconfigure the video analytics engine 230 to switch from a higher-power consumption pipeline that invokes the motion vector estimation 214, the alignment block 216 to align motion vectors to account for global motion, the SGM block 218, the domain change block 222 and the processing of the transform matrix 224, to a lower-power consumption pipeline that invokes the motion vector estimation 214, the domain change block 222, and the processing of the transform matrix 224 (e.g., and excludes the alignment block 216 and the SGM block 218). Generally, global motion estimation consumes less power than local motion estimation. Thus, the global motion estimation implemented in the lower-power consumption pipeline can result in less power consumption than the local motion estimation in the higher-power consumption pipeline which, in the higher-power consumption pipeline is implemented in addition to the global motion estimation.

Moreover, the switch from the higher-power consumption pipeline to the lower-power consumption pipeline can reduce the power consumption by the electronic device 100 in cases where there is no local motion or the local motion is below a threshold and thus do not need the higher-power consumption pipeline to accurately and efficiently estimate motion. Thus, the switch from the higher-power consumption pipeline to the lower-power consumption pipeline when there is no local motion or the local motion is below a threshold can increase the motion estimation efficiency while reducing the power consumption at the electronic device 100 without sacrificing a quality of the motion estimation (e.g., because there is no local motion or the local motion is below a threshold).

The processor 306 can continue processing the temporal filter indicator 304 and can trigger a switch to the higher-power processing flow (e.g., full resolution motion estimation) once the motion indicated in the temporal filter indicator 304 exceeds a motion threshold. To illustrate, when the temporal filter indicator 304 indicates an amount of local motion that is above a threshold, the processor 306 can reprogram or reconfigure the video analytics engine 230 to switch back to the higher-power consumption pipeline that includes the alignment block 216 and the SGM block 218 (e.g., in addition to the motion vector estimation 214, the domain change block 222, and the processing of the transform matrix 224). For example, when the temporal filter indicator 304 indicates an amount of local motion that is above a threshold, the processor 306 can generate an instruction that reprograms or reconfigures the video analytics engine 230 to switch back to the higher-power consumption pipeline that also includes the alignment block 216 and the SGM block 218.

In some cases, the switch from the higher-power consumption pipeline to the lower-power consumption pipeline can include a switch from processing higher resolution frames (e.g., full resolution versions of the target image 208 and the reference image 210) to processing lower resolution frames (e.g., lower resolution or downscaled versions of the target image 208 and the reference image 210). In some examples, the switch from processing higher resolution frames (e.g., full resolution versions of the target image 208 and the reference image 210) to processing lower resolution frames (e.g., lower resolution or downscaled versions of the target image 208 and the reference image 210) can be facilitated by a downscalar block(s) (not shown) for the target image 208 and the reference image 210.

In some examples, the threshold(s) for switching between the higher-power consumption pipeline and the lower-power consumption pipeline can be determined by evaluating image quality (IQ) information, parameters, and/or characteristics. For example, the threshold(s) for switching between the higher-power consumption pipeline and the lower-power consumption pipeline can be determined by evaluating image reconstruction information, parameters, and/or characteristics. Alternatively or additionally, the threshold(s) for switching between the higher-power consumption pipeline and the lower-power consumption pipeline can be determined by evaluating power consumption benefits and performance results or benefits associated with switching between the higher-power consumption pipeline and the lower-power consumption pipeline.

In some examples, if the motion indicated in the temporal filter indicator 304 is above a first threshold (e.g., the lower threshold noted above) but below second threshold (e.g., the upper threshold noted above), the processor 306 can refrain from triggering the video analytics engine 230 from switching to the lower-power consumption pipeline or continuing implementing the higher-power consumption pipeline with full resolution. Instead, when the motion indicated in the temporal filter indicator 304 is above a lower threshold but below an upper threshold, the processor 306 can trigger the video analytics engine 230 to switch the higher-power consumption pipeline to processing the target image 208 and the reference image 210 at a downscaled image resolution or a lower image resolution than used when the amount of motion exceeds the upper threshold.

Figure 3B:
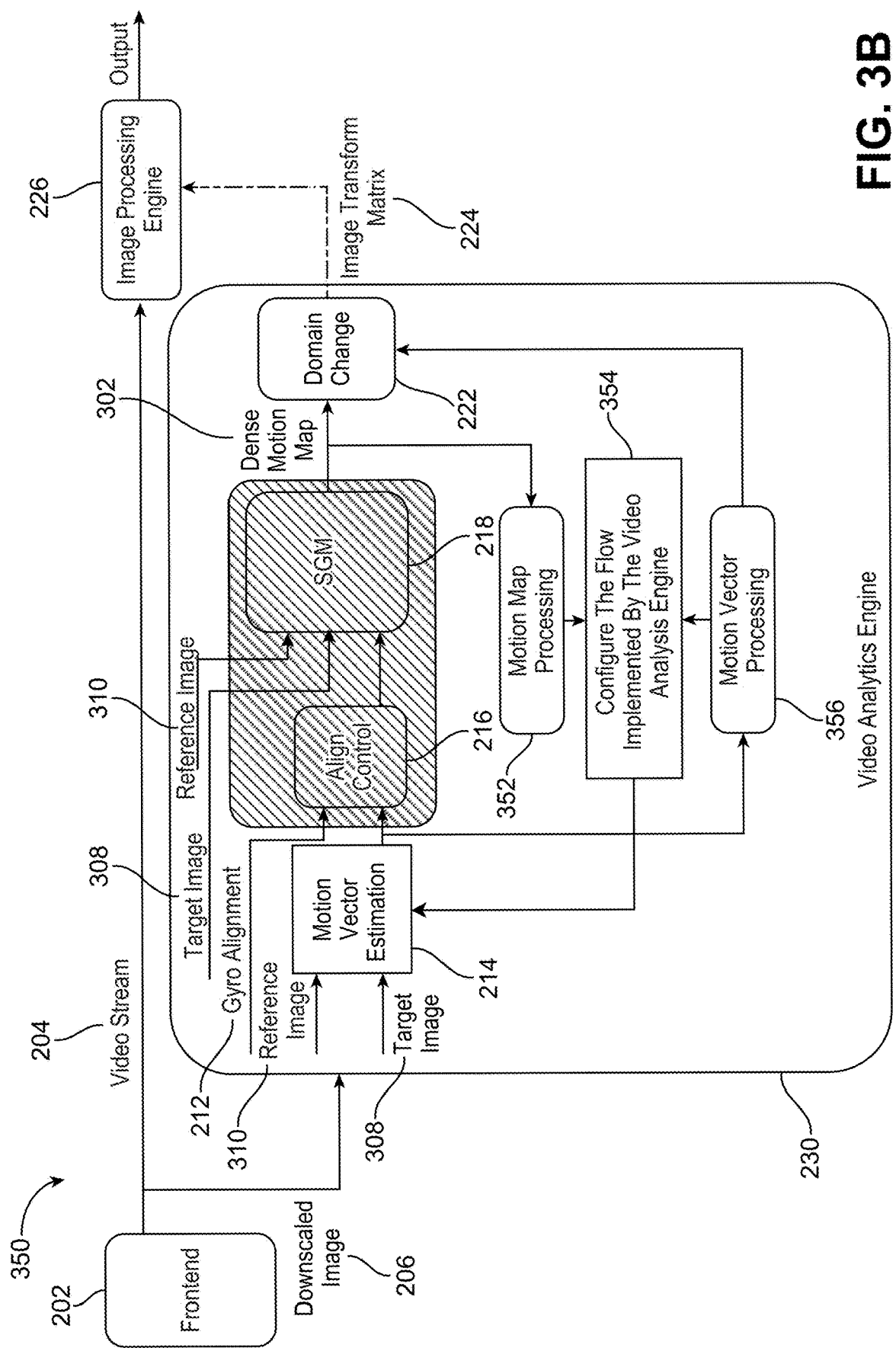

FIG. 3B is a diagram illustrating another example flow 350 for a motion estimation implementation with a feedback mechanism. In this example, the flow 350 provides a pipeline for motion estimation with feedback incorporated by the video analytics engine 230 (e.g., as opposed to feedback between the processor 306 and the video analytics engine 230).

In this example, the dense motion map 302 generated by the SGM block 218 is fed into a motion map processing block 352 that runs a computational algorithm on the dense motion map 302 to estimate the size and/or amount of motion in the dense motion map 302 and generates an instruction 354 to configure (or reconfigure) the flow implemented by the video analytics engine 230 based on the size and/or amount of motion in the dense motion map 302. For example, when the size and/or amount of motion in the dense motion map 302 is/are lower than a threshold, the instruction 354 generated by the motion map processing block 352 can trigger a switch to a lower-power consumption pipeline (e.g., global motion vector estimation). The lower-power consumption pipeline in this example includes the motion vector estimation 214, the motion vector processing 356 described below, and the domain change block 222.

In some examples, the motion vector processing 356 in the lower-power consumption pipeline can determine if a size and/or amount of motion in the motion vectors generated by the motion vector estimation 214 exceed a threshold. If the motion vector processing 356 determines that the size and/or amount of motion in the motion vectors exceed a threshold, the motion vector processing 356 can generate an instruction 354 to configure or reconfigure the flow implemented by the video analytics engine 230. In some examples, when the size and/or amount of motion in the motion vectors from the motion vector estimation 214 exceed a threshold, the instruction 354 generated by the motion vector processing 356 can trigger a switch back to a higher-power consumption flow that includes the motion vector estimation 214, the alignment block 216, the SGM block 218, and the domain change block 222. Alternatively, if the size and/or amount of motion in the motion vectors from the motion vector estimation 214 do not exceed a threshold, the motion vector processing 356 can provide the motion vectors from the motion vector estimation 214 to the domain change block 222 for processing and thus maintain the lower-power consumption pipeline that includes that motion vector estimation 214, the motion vector processing 356, and the domain change block 222.

Figure 4:
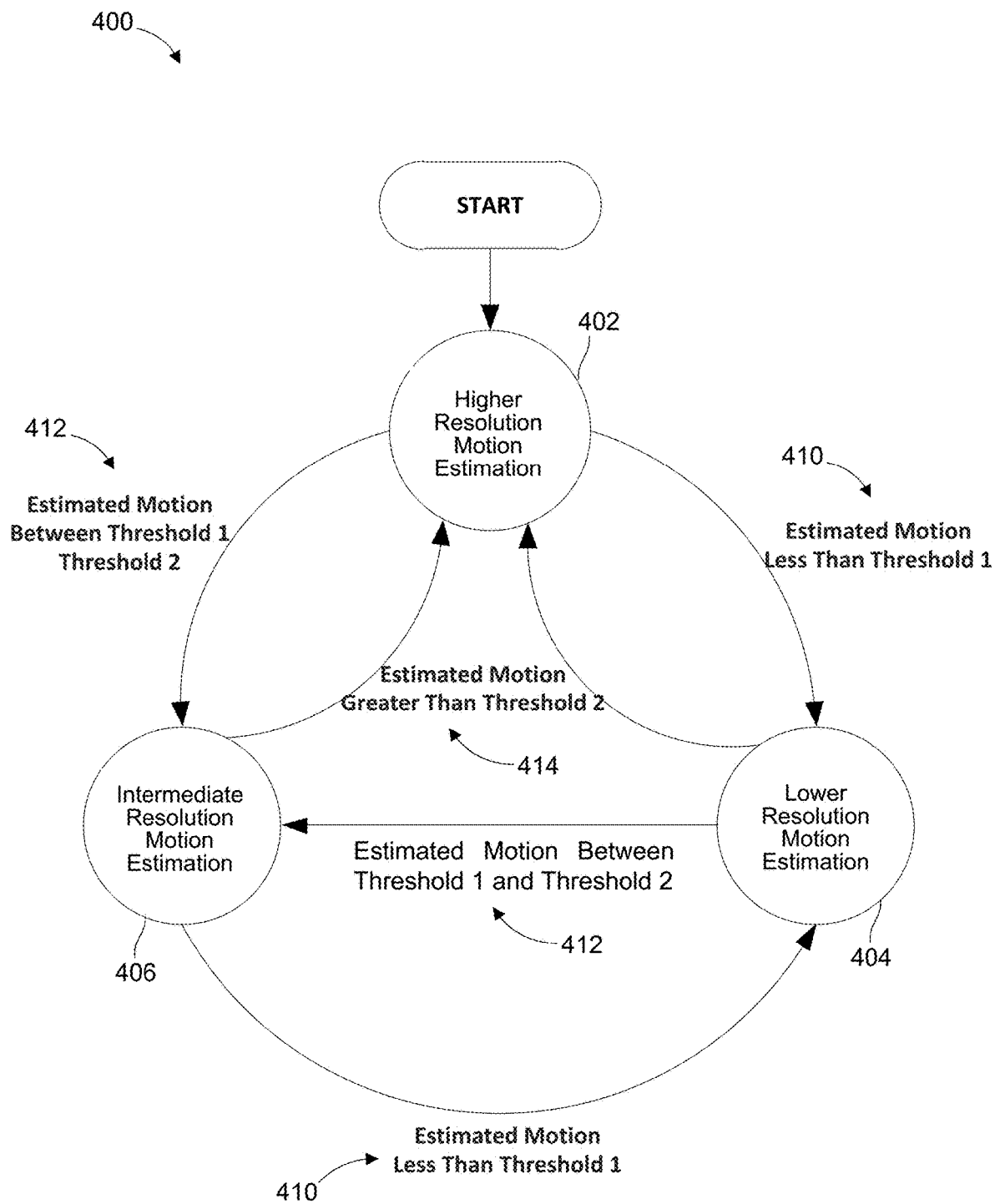
FIG. 4 is a diagram illustrating an example state machine showing various example processing states and thresholds for estimating motion, in accordance with some examples of the present disclosure.

FIG. 4 is a diagram illustrating an example state machine 400 showing various example processing states and thresholds for estimating motion. In this example, the state machine 400 starts with the electronic device 100 implementing a higher-resolution motion estimation pipeline 402 (e.g., higher-power consumption pipeline) that includes estimating motion vectors (e.g., motion vector estimation 214), an alignment block (e.g., alignment block 216) for aligning the global motion vectors to account for global motion, an SGM block (e.g., SGM block 218) for estimating local motion between frames, a domain change block (e.g., domain change block 222) that uses a global stabilization matrix to warp a dense motion map (e.g., dense motion map 220) in order to generate a transform matrix (e.g., transform matrix 224), and using the transform matrix to generate an output such as, for example, an image stabilization output.

While implementing the higher-resolution motion estimation 402, the electronic device 100 can determine whether estimated motion in an input/target frame is below a lower threshold or above the lower threshold and below an upper threshold. For example, if the electronic device 100 determines a condition 410 where the amount of estimated motion is below a lower threshold, the electronic device 100 can switch to a lower-resolution motion estimation 404 (e.g., lower-power consumption pipeline) and, if the electronic device 100 determines a condition 412 where the amount of estimated motion is above the lower threshold but below an upper threshold, the electronic device 100 can switch to an intermediate-resolution motion estimation 406 (e.g., higher-power consumption pipeline with lower resolution images).

In some examples, the lower-resolution motion estimation 404 can include global motion estimation and no local motion estimation. For example, in some cases, the lower-resolution motion estimation 404 can implement the motion vector estimation 214 and domain change block 222 blocks shown in FIG. 3A, and exclude the alignment block 216 and the SGM block 218 shown in FIG. 3A.

In some examples, the intermediate-resolution motion estimation 406 can include global motion estimation and local motion estimation using downscaled images. For example, in some cases, the intermediate-resolution motion estimation 406 can implement the motion vector estimation 214, the alignment block 216, the SGM block 218, and the domain change block 222 blocks shown in FIG. 3A, but may process downscaled images or images downscaled to a lower resolution than the images processed by the higher-resolution motion estimation 402 (e.g., the higher-power consumption pipeline described above with respect to FIG. 3A.

When the electronic device 100 implements the lower-resolution motion estimation 404, the electronic device 100 can check if the motion estimated exceeds the upper threshold and/or the lower threshold. For example, the electronic device 100 can check if the estimated motion satisfies the condition 412 where the amount of estimated motion is above the lower threshold but below the upper threshold or if the estimated motion satisfies a condition 414 where the amount of estimated motion is above the upper threshold. If the estimated motion satisfies the condition 412 where the amount of estimated motion is above the lower threshold but below the upper threshold, the electronic device 100 can switch to the intermediate-resolution motion estimation 406 and, if the estimated motion satisfies the condition 414 where the amount of estimated motion is above the upper threshold, the electronic device 100 can switch to the higher-resolution motion estimation 402.

Similarly, when the electronic device 100 implements the intermediate-resolution motion estimation 406, the electronic device 100 can check if the motion estimated exceeds the upper threshold and/or the lower threshold. For example, the electronic device 100 can check if the estimated motion satisfies the condition 414 where the amount of estimated motion is above the upper threshold or if the estimated motion satisfies a condition 410 where the amount of estimated motion is below the lower threshold. If the estimated motion satisfies the condition 414 where the amount of estimated motion is above the upper threshold, the electronic device 100 can switch to the higher-resolution motion estimation 402 and, if the estimated motion satisfies the condition 410 where the amount of estimated motion is below the lower threshold, the electronic device 100 can switch to the lower-resolution motion estimation 404.

Figure 5:
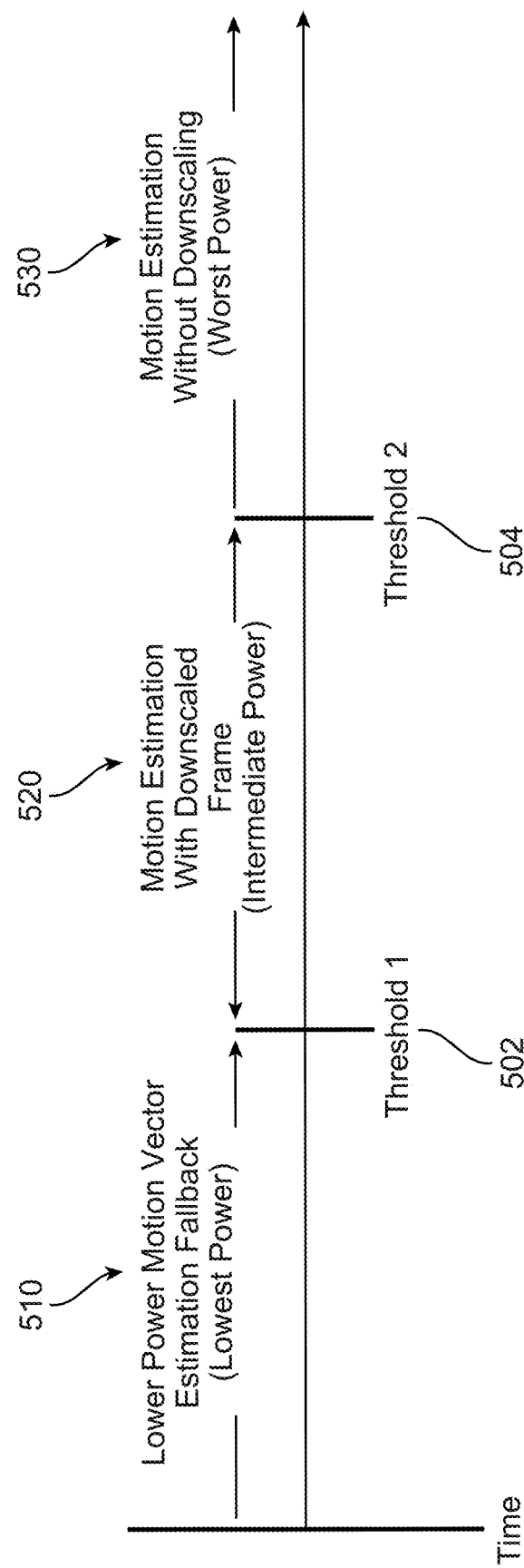
FIG. 5 is a diagram illustrating example state transitions and corresponding thresholds, in accordance with some examples of the present disclosure.

FIG. 5 is a diagram illustrating example state transitions and corresponding thresholds. In this example, the electronic device 100 implements a lower-power motion vector estimation 510 (e.g., lower-resolution motion estimation 404) until an amount of estimated motion exceeds a lower threshold 502. When the estimated motion exceeds the lower threshold 502 but remains below an upper threshold 504, the electronic device 100 can switch to motion estimation with a downscaled frame 520 (e.g., intermediate-resolution motion estimation 406). Here, the electronic device 100 can implement a higher-power consumption pipeline as previously described, but can reduce the power consumption by processing a downscaled image. Moreover, the power consumption is reduced relative to the power consumption associated with the higher-power consumption pipeline when a full resolution image is used.

When the estimated motion exceeds the upper threshold 504, the electronic device 100 can switch to motion estimation without a downscaled frame 530 (e.g., higher-resolution motion estimation 402). The electronic device 100 can implement a higher-power consumption pipeline as previously described without using a downscaled image as done when the lower threshold 502 is exceeded but the upper threshold 504 is not exceeded.

Figure 6:
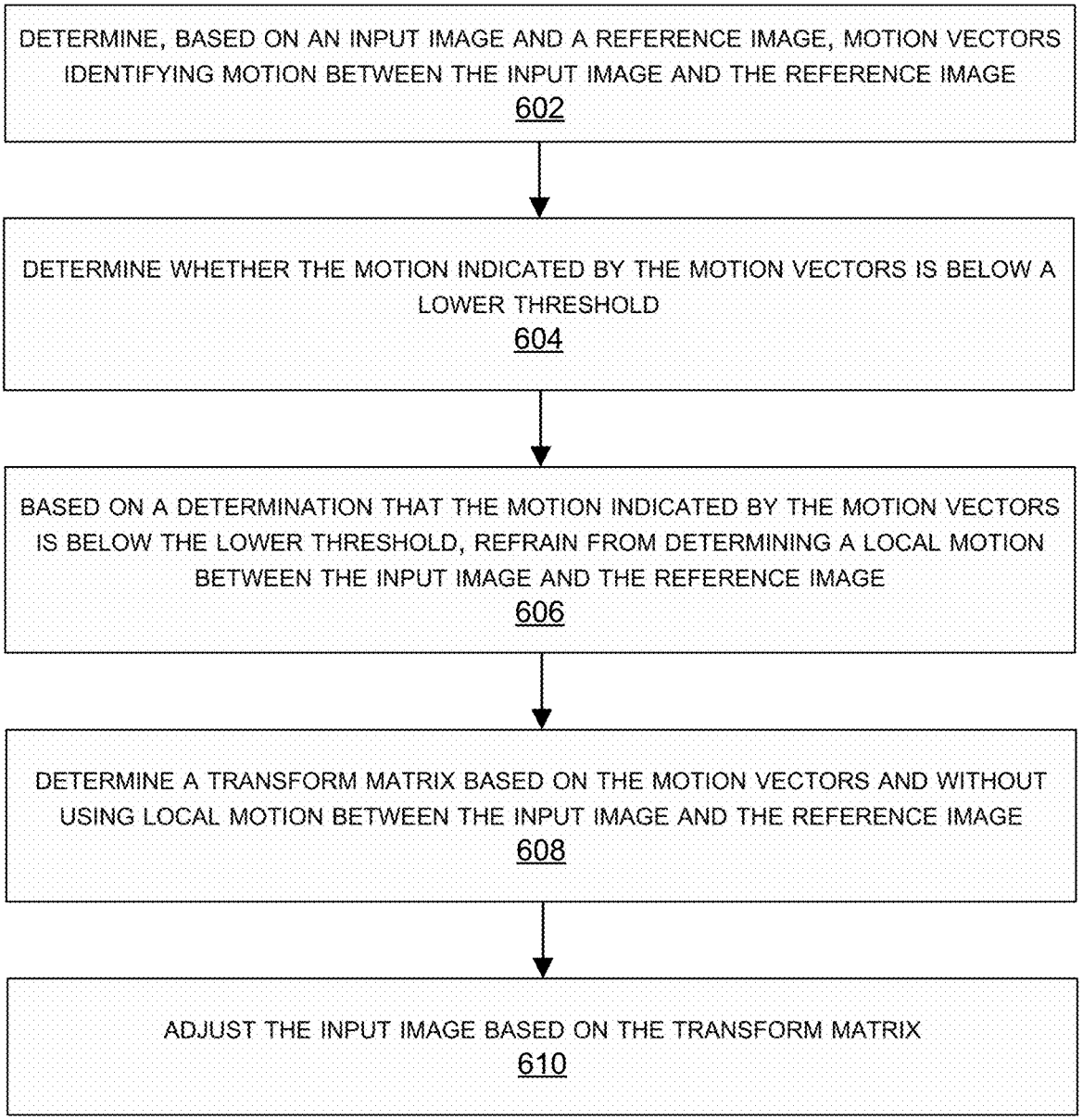
FIG. 6 is a flowchart illustrating an example process for conserving resources when performing motion estimation, in accordance with some examples of the present disclosure.

FIG. 6 is a flowchart illustrating an example process 600 for conserving resources when performing motion estimation. The process 600 can be implemented, for example, by the electronic device 100 (or component thereof, such as a chipset) or other electronic or computing device (or component thereof). At block 602, the electronic device 100 (or component thereof) may determine, based on an input image and a reference image, motion vectors identifying motion between the input image and the reference image. In some examples, the electronic device 100 (or component thereof) may determine the motion vectors based on a motion vector estimation (e.g., motion vector estimation 214) as previously described with respect to FIG. 3A. In some cases, the electronic device 100 (or component thereof) may determine the motion vectors based on a Harris corner detection algorithm.

At block 604, the electronic device 100 (or component thereof) may determine whether the motion indicated by the motion vectors is below a lower threshold. In some examples, to determine whether the motion indicated by the motion vectors is below the lower threshold, the electronic device 100 (or component thereof) may check whether the motion exceeds an upper threshold and/or the lower threshold.

At block 606, the electronic device 100 (or component thereof) may, based on a determination that the motion indicated by the motion vectors is below the lower threshold, refrain from determining a local motion between the input image and the reference image. In some examples, refraining from determining the local motion between the input image and the reference image can be based on a determination to implement a lower-power consumption pipeline (e.g., lower-resolution motion estimation 404).

At block 608, the electronic device 100 (or component thereof) may determine a transform matrix (e.g., transform matrix 224) based on the motion vectors and without using local motion between the input image and the reference image. In some examples, to determine the transform matrix based on the motion vectors, the electronic device 100 (or component thereof) may warp the motion vectors using a global stabilization matrix.

At block 610, the electronic device 100 (or component thereof) may adjust the input image based on the transform matrix. In some examples, to adjust the input image based on the transform matrix, the electronic device 100 (or component thereof) may stabilize the input image using the transform matrix.

In some aspects, the electronic device 100 (or component thereof) may determine, based on a second input image and a second reference image, additional motion vectors identifying motion between the second input image and the second reference image. The electronic device 100 (or component thereof) may determine whether the motion indicated by the additional motion vectors is below or above the lower threshold. The electronic device 100 (or component thereof) may, based on a determination that the motion indicated by the additional motion vectors is above the lower threshold, generate a motion map indicating a local motion between the second input image and the second reference image. In some examples, the determination that the motion indicated by the additional motion vectors is above the lower threshold can further include a determination that the motion indicated by the additional motion vectors is below an upper threshold that is greater than the lower threshold. In some aspects, the electronic device 100 (or component thereof) may determine an additional transform matrix based on the motion map. The electronic device 100 (or component thereof) may adjust the second input image based on the additional transform matrix. In some cases, to determine an additional transform matrix based on the motion map, the electronic device 100 (or component thereof) may warp the motion map using a global stabilization matrix.

In some aspects, the electronic device 100 (or component thereof) may, prior to generating the motion map, align the additional motion vectors based on a global motion associated with the electronic device 100. The electronic device 100 (or component thereof) may generate the motion map based on the aligned additional motion vectors. In some examples, the additional motion vectors can be aligned based on motion information obtained from a motion sensor (e.g., one or more inertial sensors 104). In some examples, the motion sensor can include a gyroscope and/or an inertial measurement unit.

In some aspects, the electronic device 100 (or component thereof) may determine that the motion indicated by the additional motion vectors is above the lower threshold and below an upper threshold that is greater than the lower threshold. In some aspects, the electronic device 100 (or component thereof) may downscale the second input image and the second reference image prior to determining the additional motion vectors identifying motion between the second input image and the second reference image. In some examples, the electronic device 100 (or component thereof) may determine the additional motion vectors based on the downscaled second input image and the downscaled second reference image.

In some aspects, the electronic device 100 (or component thereof) may determine, based on a second input image and a second reference image, additional motion vectors identifying motion between the second input image and the second reference image. The electronic device 100 (or component thereof) may determine whether the motion indicated by the additional motion vectors is above the lower threshold and below an upper threshold that is greater than the lower threshold. Based on a determination that the motion indicated by the additional motion vectors is above the lower threshold and below the upper threshold, the electronic device 100 (or component thereof) may downscale the second input image and the second reference image. The electronic device 100 (or component thereof) may generate a motion map indicating a local motion between the downscaled second input image and the downscaled second reference image. The electronic device 100 (or component thereof) may further determine an additional transform matrix based on the motion map and may adjust the second input image based on the additional transform matrix. In some examples, to determine an additional transform matrix based on the motion map, the electronic device 100 (or component thereof) may warp the motion map using a global stabilization matrix.

In some aspects, prior to generating the motion map, the electronic device 100 (or component thereof) may align the additional motion vectors based on a global motion associated with the electronic device. In some cases, the electronic device 100 (or component thereof) may align the additional motion vectors based on motion information obtained from a motion sensor. In some examples, the motion sensor can include a gyroscope or an inertial measurement unit. In some aspects, the electronic device 100 (or component thereof) may generate the motion map based on the aligned additional motion vectors.

In some examples, the processes described herein (e.g., process 600 and/or any other process described herein) may be performed by a computing device or apparatus. In one example, the process 600 can be performed by the electronic device 100 of FIG. 1. In another example, the process 600 can be performed by the computing system having the computing system 700 shown in FIG. 7. For instance, a computing device with the computing system 700 shown in FIG. 7 can implement the operations of FIG. 5 and/or the components and/or operations described herein with respect to any of FIGS. 1 through 5.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein, including the process 600 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 600 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 7:
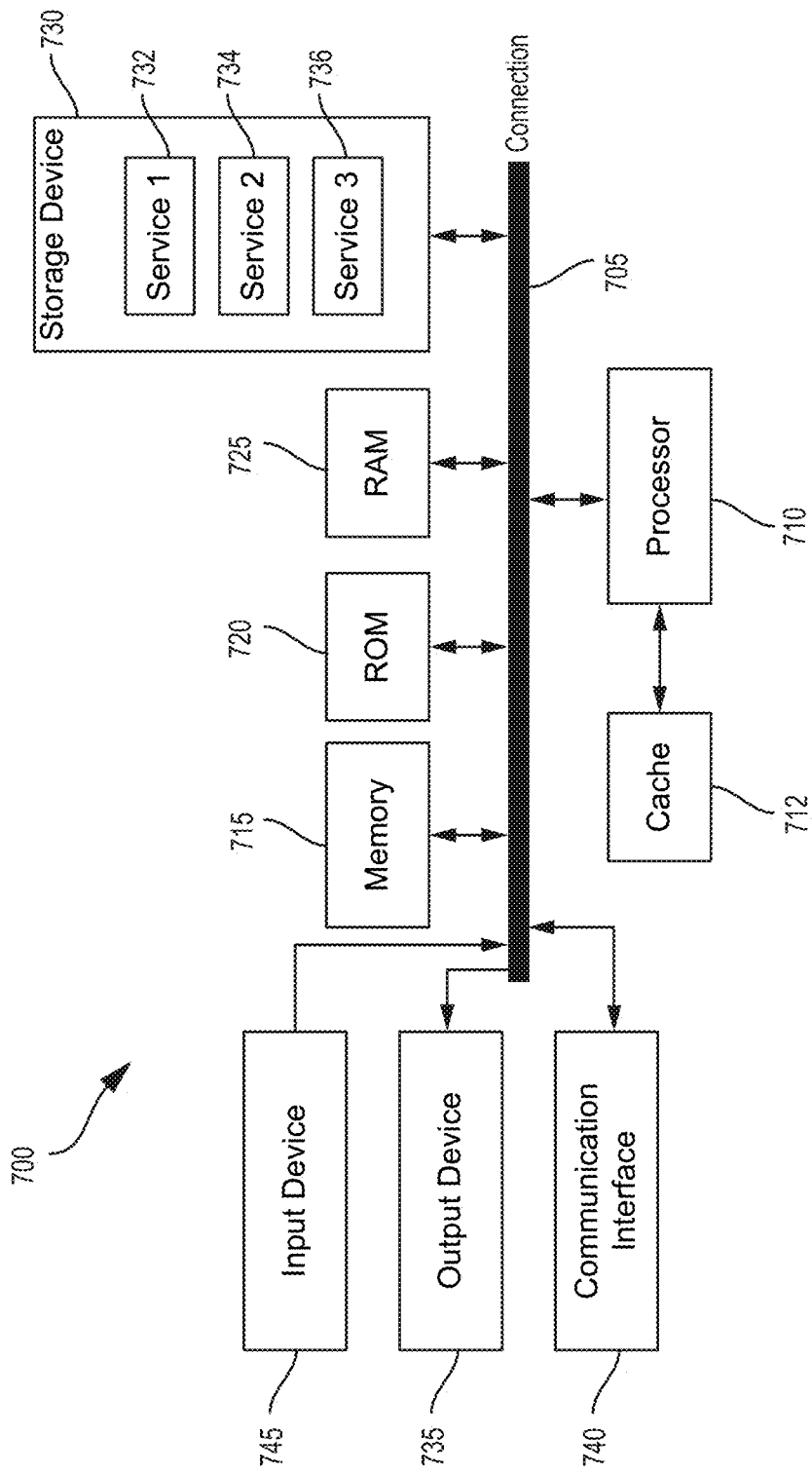
FIG. 7 is a diagram illustrating an example system architecture for implementing certain aspects described herein.

FIG. 7 is a diagram illustrating an example of a system for implementing certain aspects of the present technology. In particular, FIG. 7 illustrates an example of computing system 700, which can be for example any computing device making up a computing system, a camera system, or any component thereof in which the components of the system are in communication with each other using connection 705. Connection 705 can be a physical connection using a bus, or a direct connection into processor 710, such as in a chipset architecture. Connection 705 can also be a virtual connection, networked connection, or logical connection.

In some examples, computing system 700 is a distributed system in which the functions described in this disclosure can be distributed within a datacenter, multiple data centers, a peer network, etc. In some examples, one or more of the described system components represents many such components each performing some or all of the function for which the component is described. In some examples, the components can be physical or virtual devices.

Example system 700 includes at least one processing unit (CPU or processor) 710 and connection 705 that couples various system components including system memory 715, such as read-only memory (ROM) 720 and random access memory (RAM) 725 to processor 710. Computing system 700 can include a cache 712 of high-speed memory connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 702.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 730 can include software services, servers, services, etc., that when the code that defines such software is executed by the processor 710, it causes the system to perform a function. In some examples, a hardware service that performs a particular function can include the software component stored in a computer-readable medium in connection with the necessary hardware components, such as processor 710, connection 705, output device 735, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects and examples in unnecessary detail. In other instances, well-known circuits, processes, algorithms, structures, and techniques may be shown without unnecessary detail in order to avoid obscuring the aspects and examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein can also be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples and aspects of the disclosure can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the present disclosure include:

Aspect 1. An apparatus for processing image data, the apparatus comprising: at least one memory; and at least one processor coupled to the at least one memory, the at least one processor configured to: determine, based on an input image and a reference image, motion vectors indicating motion between the input image and the reference image; determine whether the motion indicated by the motion vectors is below a first threshold; based on a determination that the motion indicated by the motion vectors is below the first threshold, refrain from determining a local motion between the input image and the reference image; determine a transform matrix based on the motion vectors and without using the local motion between the input image and the reference image; and adjust the input image based on the transform matrix.

Aspect 2. The apparatus of Aspect 1, wherein, to adjust the input image based on the transform matrix, the at least one processor is configured to stabilize the input image using the transform matrix.

Aspect 3. The apparatus of any of Aspects 1 or 2, wherein, to determine the transform matrix based on the motion vectors, the at least one processor is configured to warp the motion vectors using a global stabilization matrix.

Aspect 4. The apparatus of any of Aspects 1 to 3, wherein the at least one processor is configured to: determine, based on a second input image and a second reference image, additional motion vectors identifying motion between the second input image and the second reference image; determine whether the motion indicated by the additional motion vectors is below or above the first threshold; based on a determination that the motion indicated by the additional motion vectors is above the first threshold, generate a motion map indicating a local motion between the second input image and the second reference image; determine an additional transform matrix based on the motion map; and adjust the second input image based on the additional transform matrix.

Aspect 5. The apparatus of Aspect 4, wherein, to determine an additional transform matrix based on the motion map, the at least one processor is configured to warp the motion map using a global stabilization matrix.

Aspect 6. The apparatus of any of Aspects 4 or 5, wherein the at least one processor is configured to: prior to generating the motion map, align the additional motion vectors based on a global motion associated with the apparatus, the additional motion vectors being aligned based on motion information obtained from a motion sensor, the motion sensor comprising at least one of a gyroscope and an inertial measurement unit; and generate the motion map based on the aligned additional motion vectors.

Aspect 7. The apparatus of any of Aspects 4 to 6, wherein the at least one processor is configured to determine that the motion indicated by the additional motion vectors is above the first threshold and below a second threshold that is greater than the first threshold.

Aspect 8. The apparatus of any of Aspects 4 to 7, wherein the at least one processor is configured to: prior to determining the additional motion vectors identifying motion between the second input image and the second reference image, downscale the second input image and the second reference image, wherein the additional motion vectors are determined based on the downscaled second input image and the downscaled second reference image.

Aspect 9. The apparatus of any of Aspects 1 to 8, wherein the at least one processor is configured to: determine, based on a second input image and a second reference image, additional motion vectors identifying motion between the second input image and the second reference image; determine whether the motion indicated by the additional motion vectors is above the first threshold and below a second threshold that is greater than the first threshold; and based on a determination that the motion indicated by the additional motion vectors is above the first threshold and below the second threshold: downscale the second input image and the second reference image; generate a motion map indicating a local motion between the downscaled second input image and the downscaled second reference image; determine an additional transform matrix based on the motion map; and adjust the second input image based on the additional transform matrix.

Aspect 10. The apparatus of Aspect 9, wherein, to determine an additional transform matrix based on the motion map, the at least one processor is configured to warp the motion map using a global stabilization matrix.

Aspect 11. The apparatus of any of Aspects 9 or 10, wherein the at least one processor is configured to: prior to generating the motion map, align the additional motion vectors based on a global motion associated with the apparatus, the additional motion vectors being aligned based on motion information obtained from a motion sensor, the motion sensor comprising at least one of a gyroscope and an inertial measurement unit.

Aspect 12. The apparatus of Aspect 11, wherein, to generate the motion map, the at least one processor is configured to generate the motion map based on the aligned additional motion vectors.

Aspect 13. The apparatus of any of Aspects 1 to 12, further comprising a camera configured to capture a video sequence comprising the input image and the reference image.

Aspect 14. The apparatus of any of Aspects 1 to 13, wherein the apparatus comprises a mobile device.

Aspect 15. A method of processing image data, the method comprising: determining, by a computing device based on an input image and a reference image, motion vectors indicating motion between the input image and the reference image; determining, by the computing device, whether the motion indicated by the motion vectors is below a first threshold; based on a determination that the motion indicated by the motion vectors is below the first threshold, refraining from determining a local motion between the input image and the reference image; determining, by the computing device, a transform matrix based on the motion vectors and without using the local motion between the input image and the reference image; and adjusting, by the computing device, the input image based on the transform matrix.

Aspect 16. The method of Aspect 15, wherein adjusting the input image based on the transform matrix comprises stabilizing the input image using the transform matrix.

Aspect 17. The method of any of Aspects 15 to 16, wherein determining the transform matrix based on the motion vectors comprises warping the motion vectors using a global stabilization matrix.

Aspect 18. The method of any of Aspects 15 to 17, further comprising: determining, based on a second input image and a second reference image, additional motion vectors identifying motion between the second input image and the second reference image; determining whether the motion indicated by the additional motion vectors is below or above the first threshold; based on a determination that the motion indicated by the additional motion vectors is above the first threshold, generating a motion map indicating a local motion between the second input image and the second reference image; determining an additional transform matrix based on the motion map; and adjusting the second input image based on the additional transform matrix.

Aspect 19. The method of Aspect 18, wherein determining an additional transform matrix based on the motion map comprises warping the motion map using a global stabilization matrix.

Aspect 20. The method of any of Aspects 18 or 19, further comprising: prior to generating the motion map, aligning the additional motion vectors based on a global motion associated with the computing device, the additional motion vectors being aligned based on motion information obtained from a motion sensor, the motion sensor comprising at least one of a gyroscope and an inertial measurement unit; and generating the motion map based on the aligned additional motion vectors.

Aspect 21. The method of any of Aspects 18 to 20, further comprising determining that the motion indicated by the additional motion vectors is above the first threshold and below a second threshold that is greater than the first threshold.

Aspect 22. The method of any of Aspects 18 to 21, further comprising: prior to determining the additional motion vectors identifying motion between the second input image and the second reference image, downscaling the second input image and the second reference image, wherein the additional motion vectors are determined based on the downscaled second input image and the downscaled second reference image.

Aspect 23. The method of any of Aspects 15 to 22, further comprising: determining, based on a second input image and a second reference image, additional motion vectors identifying motion between the second input image and the second reference image; determining whether the motion indicated by the additional motion vectors is above the first threshold and below a second threshold that is greater than the first threshold; and based on a determination that the motion indicated by the additional motion vectors is above the first threshold and below the second threshold: downscaling the second input image and the second reference image; generating a motion map indicating a local motion between the downscaled second input image and the downscaled second reference image; determining an additional transform matrix based on the motion map; and adjusting the second input image based on the additional transform matrix.

Aspect 24. The method of Aspect 23, wherein determining an additional transform matrix based on the motion map comprising warping the motion map using a global stabilization matrix.

Aspect 25. The method of any of Aspects 23 or 24, further comprising: prior to generating the motion map, aligning the additional motion vectors based on a global motion associated with the computing device, the additional motion vectors being aligned based on motion information obtained from a motion sensor, the motion sensor comprising at least one of a gyroscope and an inertial measurement unit.

Aspect 26. The method of Aspect 25, wherein generating the motion map comprises generating the motion map based on the aligned additional motion vectors.

Aspect 27. A non-transitory computer-readable medium having stored thereon instructions that, when executed by one or more processors, cause the one or more processors to perform operations according to any of Aspects 1 to 26.

Aspect 28. An apparatus for processing image data, the apparatus comprising one or more means for performing operations according to any of Aspects 1 to 26.

What is claimed is:

1. An apparatus for processing image data, the apparatus comprising:
at least one memory; and
at least one processor coupled to the at least one memory, the at least one processor configured to:
   determine, using a higher-power motion estimation pipeline, a dense motion map between a first input image and a first reference image, the dense motion map indicating local motion between pixels in the first input image and pixels in the first reference image;
   determine that the local motion indicated by the dense motion map is below a first threshold;
   in response to a determination that the local motion indicated by the motion vectors dense motion map is below the first threshold, switch from the higher-power motion estimation pipeline to a lower-power motion estimation pipeline for a second input image and a second reference image, wherein, using the lower-power motion estimation pipeline, the at least one processor is configured to:
      determine, using descriptor matching estimation, motion vectors indicating global motion between the second input image and the second reference image;
      refrain from determining a dense motion map between the second input image and the second reference image;
      refrain from performing image alignment between the second input image and the second reference image; and
      warp the motion vectors using a global stabilization matrix to generate a transform matrix without using the dense motion map between the second input image and the second reference image; and
   perform image stabilization for the second input image using the transform matrix.

2. The apparatus of claim 1, wherein the at least one processor is configured to:
determine, based on a third input image and a third reference image, additional motion vectors identifying motion between the third input image and the third reference image;
determine whether the motion indicated by the additional motion vectors is below or above the first threshold;

based on a determination that the motion indicated by the additional motion vectors is above the first threshold, generate an additional dense motion map indicating a local motion between the third input image and the third reference image;

determine an additional transform matrix based on the additional dense motion map; and adjust the third input image based on the additional transform matrix.

3. The apparatus of claim 2, wherein, to determine the additional transform matrix based on the additional dense motion map, the at least one processor is configured to warp the additional dense motion map using the global stabilization matrix.

4. The apparatus of claim 2, wherein the at least one processor is configured to:

prior to generating the additional dense motion map, align the additional motion vectors based on a global motion associated with the apparatus, the additional motion vectors being aligned based on motion information obtained from a motion sensor, the motion sensor comprising at least one of a gyroscope or an inertial measurement unit; and generate the additional dense motion map based on the aligned additional motion vectors.

5. The apparatus of claim 2, wherein the at least one processor is configured to determine that the motion indicated by the additional motion vectors is above the first threshold and below a second threshold that is greater than the first threshold.

6. The apparatus of claim 2, wherein the at least one processor is configured to:

prior to determining the additional motion vectors identifying motion between the third input image and the third reference image, downscale the third input image and the third reference image, wherein the additional motion vectors are determined based on the downscaled third input image and the downscaled third reference image.

7. The apparatus of claim 1, wherein the at least one processor is configured to:

determine, based on a third input image and a third reference image, additional motion vectors identifying motion between the third input image and the third reference image;

determine whether the motion indicated by the additional motion vectors is above the first threshold and below a second threshold that is greater than the first threshold; and based on a determination that the motion indicated by the additional motion vectors is above the first threshold and below the second threshold:

downscale the third input image and the third reference image;

generate an additional local motion map indicating a local motion between the downscaled third input image and the downscaled third reference image;

determine an additional transform matrix based on the additional local motion map; and adjust the third input image based on the additional transform matrix.

8. The apparatus of claim 7, wherein, to determine the additional transform matrix based on the additional local motion map, the at least one processor is configured to warp the additional local motion map using the global stabilization matrix.

9. The apparatus of claim 7, wherein the at least one processor is configured to:

prior to generating the additional local motion map, align the additional motion vectors based on a global motion associated with the apparatus, the additional motion vectors being aligned based on motion information obtained from a motion sensor, the motion sensor comprising at least one of a gyroscope and an inertial measurement unit.

10. The apparatus of claim 9, wherein the at least one processor is configured to generate the additional local motion map based on the aligned additional motion vectors.

11. The apparatus of claim 1, further comprising a camera configured to capture a video sequence comprising the first input image, the first reference image, the second input image, and the second reference image.

12. The apparatus of claim 1, wherein the apparatus comprises a mobile device.

13. A method of processing image data, the method comprising:

determining, by a computing device using a higher-power motion estimation pipeline, a dense motion map between a first input image and a first reference image, the dense motion map indicating local motion between pixels in the first input image and pixels in the first reference image;

determining that the local motion indicated by the dense motion map is below a first threshold;

in response to a determination that the local motion indicated by the dense motion map is below the first threshold, switch from the higher-power motion estimation pipeline to a lower-power motion estimation pipeline for a second input image and a second reference image, wherein the lower-power motion estimation pipeline includes:

determining motion vectors indicating global motion between the second input image and the second reference image;

refraining from determining a dense motion map between the second input image and the second reference image;

refraining from performing image alignment between the second input image and the second reference image; and warping the motion vectors using a global stabilization matrix to generate a transform matrix without using the dense motion map between the second input image and the second reference image; and performing image stabilization for the second input image using the transform matrix.

14. The method of claim 13, further comprising:

determining, based on a third input image and a third reference image, additional motion vectors identifying motion between the third input image and the third reference image;

determining whether the motion indicated by the additional motion vectors is below or above the first threshold;

based on a determination that the motion indicated by the additional motion vectors is above the first threshold, generate a motion map indicating a local motion between the third input image and the third reference image;

determining an additional transform matrix based on the motion map; and adjusting the third input image based on the additional transform matrix.

15. The method of claim 14, wherein determining the additional transform matrix based on the motion map comprises warping the motion map using the global stabilization matrix.

16. The method of claim 14, further comprising:
prior to generating the motion map, aligning the additional motion vectors based on a global motion associated with the computing device, the additional motion vectors being aligned based on motion information obtained from a motion sensor, the motion sensor comprising at least one of a gyroscope and an inertial measurement unit; and
generating the motion map based on the aligned additional motion vectors.

17. The method of claim 14, further comprising determining that the motion indicated by the additional motion vectors is above the first threshold and below a second threshold that is greater than the first threshold.

18. The method of claim 14, further comprising:
prior to determining the additional motion vectors identifying motion between the third input image and the third reference image, downscale the third input image and the third reference image, wherein the additional motion vectors are determined based on the downscaled third input image and the downscaled third reference image.

19. The method of claim 13, further comprising:
determining, based on a third input image and a third reference image, additional motion vectors identifying motion between the third input image and the third reference image;
determining whether the motion indicated by the additional motion vectors is above the first threshold and below a second threshold that is greater than the first threshold; and
based on a determination that the motion indicated by the additional motion vectors is above the first threshold and below the second threshold:
downscaling the third input image and the third reference image;
generating a motion map indicating a local motion between the downscaled third input image and the downscaled third reference image;
determining an additional transform matrix based on the motion map; and
adjusting the third input image based on the additional transform matrix.

20. The method of claim 19, wherein determining the additional transform matrix based on the motion map comprising warping the motion map using the global stabilization matrix.

21. The method of claim 19, further comprising:
prior to generating the motion map, aligning the additional motion vectors based on a global motion associated with the computing device, the additional motion vectors being aligned based on motion information obtained from a motion sensor, the motion sensor comprising at least one of a gyroscope and an inertial measurement unit.

22. The method of claim 21, wherein generating the motion map comprises generating the motion map based on the aligned additional motion vectors.

23. A non-transitory computer-readable medium having stored thereon instructions that, when executed by one or more processors, cause the one or more processors to:
determine, using a higher-power motion estimation pipeline, a dense motion map between a first input image and a first reference image, the dense motion map indicating local motion between pixels in the first input image and pixels in the first reference image;
determine that the local motion indicated by the dense motion map is below a first threshold;
in response to a determination that the local motion indicated by the dense motion map is below the first threshold, switch from the higher-power motion estimation pipeline to a lower-power motion estimation pipeline for a second input image and a second reference image, wherein, using the lower-power motion estimation pipeline, the instructions, when executed by the one or more processors, cause the one or more processors to:
determine motion vectors indicating global motion between the second input image and the second reference image;
refrain from determining a dense motion map between the second input image and the second reference image;
refrain from performing image alignment between the second input image and the second reference image; and
warp the motion vectors using a global stabilization matrix to generate a transform matrix without using the dense motion map between the second input image and the second reference image; and
perform image stabilization for the second input image using the transform matrix.

24. The non-transitory computer-readable medium of claim 23, further comprising instructions that, when executed by the one or more processors, cause the one or more processors to:
determine, based on a third input image and a third reference image, additional motion vectors identifying motion between the third input image and the third reference image;
determine whether the motion indicated by the additional motion vectors is below or above the first threshold;
based on a determination that the motion indicated by the additional motion vectors is above the first threshold, generate a motion map indicating a local motion between the third input image and the third reference image;
determine an additional transform matrix based on the motion map; and
adjust the third input image based on the additional transform matrix.

25. The non-transitory computer-readable medium of claim 24, wherein, to determine the additional transform matrix based on the motion map, the instructions, when executed by the one or more processors, cause the one or more processors to warp the motion map using the global stabilization matrix.

26. The non-transitory computer-readable medium of claim 24, further comprising instructions that, when executed by the one or more processors, cause the one or more processors to:
prior to generating the motion map, align the additional motion vectors based on a global motion associated with a computing device comprising the non-transitory computer-readable medium, the additional motion vectors being aligned based on motion information obtained from a motion sensor, the motion sensor comprising at least one of a gyroscope and an inertial measurement unit; and generate the motion map based on the aligned additional motion vectors.

27. The non-transitory computer-readable medium of claim 24, further comprising instructions that, when executed by the one or more processors, cause the one or more processors to determine that the motion indicated by the additional motion vectors is above the first threshold and below a second threshold that is greater than the first threshold.

28. The non-transitory computer-readable medium of claim 24, further comprising instructions that, when executed by the one or more processors, cause the one or more processors to:
    prior to determining the additional motion vectors identifying motion between the third input image and the third reference image, downscale the third input image and the third reference image, wherein the additional motion vectors are determined based on the downscaled third input image and the downscaled third reference image.

29. The apparatus of claim 1, wherein the second reference image is the first input image.

30. The method of claim 13, wherein the second reference image is the first input image.

* * * * *